United States Patent
Eggers et al.

(10) Patent No.: US 9,848,252 B2
(45) Date of Patent: Dec. 19, 2017

(54) SYSTEM AND METHOD FOR WIRELESS COMMUNICATIONS

(75) Inventors: Patrick Claus Friedrich Eggers, Lystrup (DK); Boyan Radkov Yanakiev, Aalborg Ø (DK); Gert Frølund Pedersen, Storvorde (DK); Alex Oprea, Toronto (CA)

(73) Assignee: Lyngsoe Systems, Mississauga (CA)

( * ) Notice: Subject to any disclaimer, the term of this patent is extended or adjusted under 35 U.S.C. 154(b) by 46 days.

(21) Appl. No.: 13/432,158

(22) Filed: Mar. 28, 2012

(65) Prior Publication Data

US 2012/0182129 A1 Jul. 19, 2012

Related U.S. Application Data

(63) Continuation of application No. 12/134,710, filed on Jun. 6, 2008, now Pat. No. 8,149,093.

(51) Int. Cl.
*H04Q 5/22* (2006.01)
*H04Q 9/00* (2006.01)

(52) U.S. Cl.
CPC .......... *H04Q 9/00* (2013.01); *H04Q 2209/47* (2013.01); *H04Q 2209/84* (2013.01)

(58) Field of Classification Search
CPC ...... G01S 13/84; H04Q 9/00; H04Q 2209/47; H04Q 2209/84
USPC ... 340/572.1, 539.13, 5.92, 10.1, 10.4, 10.5; 342/1–205
See application file for complete search history.

(56) References Cited

U.S. PATENT DOCUMENTS

| | | | | |
|---|---|---|---|---|
| 4,728,959 A | * | 3/1988 | Maloney et al. | 342/457 |
| 5,570,094 A | * | 10/1996 | Armstrong | 342/107 |
| 5,969,254 A | * | 10/1999 | Yamaguchi | 73/602 |
| 6,400,318 B1 | * | 6/2002 | Kasami et al. | 342/383 |
| 6,420,847 B1 | * | 7/2002 | Galbiati et al. | 318/727 |
| 6,433,740 B1 | * | 8/2002 | Gilhousen | 342/442 |
| 6,489,917 B2 | * | 12/2002 | Geisheimer et al. | 342/127 |
| 6,633,254 B1 | * | 10/2003 | Sutphin | 342/28 |
| 6,656,136 B1 | * | 12/2003 | Weng et al. | 601/2 |
| 6,868,073 B1 | * | 3/2005 | Carrender | 370/278 |
| 7,045,996 B2 | * | 5/2006 | Lyon | G01D 21/00 324/207.11 |
| 7,079,029 B2 | * | 7/2006 | Tsuji | 340/552 |
| 7,119,737 B2 | * | 10/2006 | Tsuji | 342/129 |
| 7,228,228 B2 | * | 6/2007 | Bartlett et al. | 701/517 |
| 7,265,675 B1 | * | 9/2007 | Carrender | G06K 7/10346 340/10.1 |
| 7,304,571 B2 | * | 12/2007 | Halsey et al. | 340/539.13 |
| 7,421,321 B2 | * | 9/2008 | Breed et al. | 701/33.6 |
| 7,451,647 B2 | * | 11/2008 | Matsuhisa et al. | 73/514.18 |
| 7,468,691 B2 | * | 12/2008 | Yoshioka | 342/357.69 |
| 7,574,732 B2 | * | 8/2009 | Knox et al. | 726/3 |

(Continued)

*Primary Examiner* — Zhen Y Wu

(57) ABSTRACT

A method and system for estimating position of a moving RFID tag is provided. The method includes transmitting at least one interrogator signal; receiving, at an interrogator antenna, a reflected signal from the RFID tag; determining phase changes of the reflected signal with respect to the phase of the at least one interrogator signal; weighting the phase changes based on instant power corresponding to the phase changes; producing a phase trajectory for the reflected signal based on the weighted phase changes; and estimating position of the RFID tag relative to the interrogator antenna based on the peak of the phase trajectory for the reflected signal.

14 Claims, 4 Drawing Sheets

(56) References Cited

U.S. PATENT DOCUMENTS

| | | | |
|---|---|---|---|
| 7,580,378 B2* | 8/2009 | Carrender et al. | 370/278 |
| 7,688,255 B2* | 3/2010 | Suzuki et al. | 342/133 |
| 7,839,289 B2* | 11/2010 | Chung et al. | 340/572.8 |
| 7,884,753 B2* | 2/2011 | Peczalski et al. | 342/44 |
| 7,903,022 B2* | 3/2011 | Ohara et al. | 342/127 |
| 7,961,147 B1* | 6/2011 | VanLaningham et al. | 342/424 |
| 8,040,280 B2* | 10/2011 | Seong et al. | 342/442 |
| 8,279,109 B1* | 10/2012 | Piesinger | 342/43 |
| 8,300,846 B2* | 10/2012 | Kim et al. | 381/94.3 |
| 2001/0020918 A1* | 9/2001 | Takai | 343/729 |
| 2002/0097180 A1* | 7/2002 | Geisheimer et al. | 342/127 |
| 2002/0113709 A1* | 8/2002 | Helms | 340/572.7 |
| 2002/0126013 A1* | 9/2002 | Bridgelall | 340/572.1 |
| 2003/0030568 A1* | 2/2003 | Lastinger et al. | 340/825.49 |
| 2003/0199286 A1* | 10/2003 | D du Toit | 455/550.1 |
| 2004/0102937 A1* | 5/2004 | Ibrahim | 703/2 |
| 2004/0122662 A1* | 6/2004 | Crockett | 704/200.1 |
| 2004/0257228 A1* | 12/2004 | Tsuji | 340/552 |
| 2004/0260506 A1* | 12/2004 | Jones et al. | 702/150 |
| 2005/0159891 A1* | 7/2005 | Cohen et al. | 701/213 |
| 2005/0206555 A1* | 9/2005 | Bridgelall | G01S 5/14 342/127 |
| 2005/0237953 A1* | 10/2005 | Carrender | G01S 13/84 370/278 |
| 2005/0259769 A1* | 11/2005 | Wang et al. | 375/346 |
| 2006/0074893 A1* | 4/2006 | Snijder et al. | 707/4 |
| 2006/0166681 A1* | 7/2006 | Lohbihler | 455/456.2 |
| 2006/0279641 A1* | 12/2006 | Takahashi et al. | 348/226.1 |
| 2007/0008069 A1* | 1/2007 | Lastinger et al. | 340/10.1 |
| 2007/0013580 A1* | 1/2007 | Finch et al. | 342/160 |
| 2007/0064792 A1* | 3/2007 | Chiu et al. | 375/240.03 |
| 2007/0247368 A1* | 10/2007 | Wu | 342/465 |
| 2007/0285312 A1* | 12/2007 | Gao et al. | 342/367 |
| 2008/0018535 A1* | 1/2008 | Hwang et al. | 342/368 |
| 2008/0074307 A1* | 3/2008 | Boric-Lubecke et al. | 342/28 |
| 2008/0075037 A1* | 3/2008 | Guo et al. | 370/329 |
| 2008/0079541 A1* | 4/2008 | Rofougaran | 340/10.1 |
| 2008/0096517 A1* | 4/2008 | Appleyard | H04W 4/16 455/403 |
| 2008/0143482 A1* | 6/2008 | Shoarinejad | G01S 7/003 340/10.1 |
| 2008/0143584 A1* | 6/2008 | Shoarinejad et al. | 342/127 |
| 2008/0150699 A1* | 6/2008 | Ohara | G01S 13/84 340/10.4 |
| 2008/0183082 A1* | 7/2008 | Farringdon et al. | 600/481 |
| 2008/0198071 A1* | 8/2008 | Hwang et al. | 342/373 |
| 2008/0218357 A1* | 9/2008 | March et al. | 340/573.1 |
| 2008/0316104 A1* | 12/2008 | Seong et al. | 342/442 |
| 2009/0135044 A1* | 5/2009 | Sutphin | 342/22 |
| 2009/0303006 A1* | 12/2009 | Eggers et al. | 340/10.1 |
| 2010/0039233 A1* | 2/2010 | Niedzwiecki et al. | 340/10.1 |
| 2010/0090893 A1* | 4/2010 | Hoshizaki | 342/357.09 |
| 2010/0109903 A1* | 5/2010 | Carrick | 340/825.49 |
| 2010/0234044 A1* | 9/2010 | Lohbihler | 455/456.1 |
| 2011/0032144 A1* | 2/2011 | Cohen et al. | 342/357.31 |
| 2011/0102154 A1* | 5/2011 | Hindhede | 340/10.1 |
| 2011/0102243 A1* | 5/2011 | Sai et al. | 342/124 |
| 2012/0182129 A1* | 7/2012 | Eggers et al. | 340/10.1 |

* cited by examiner

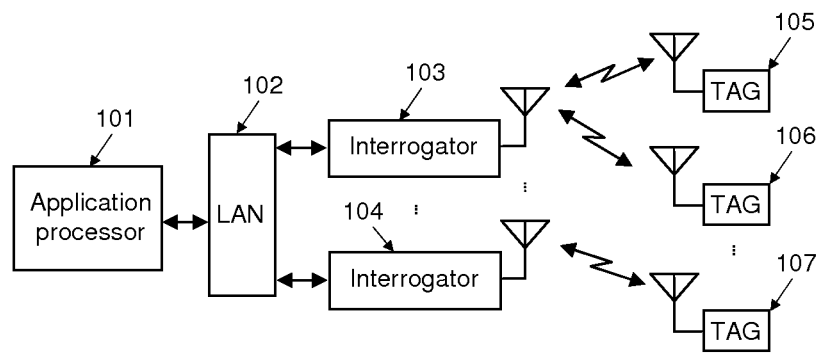
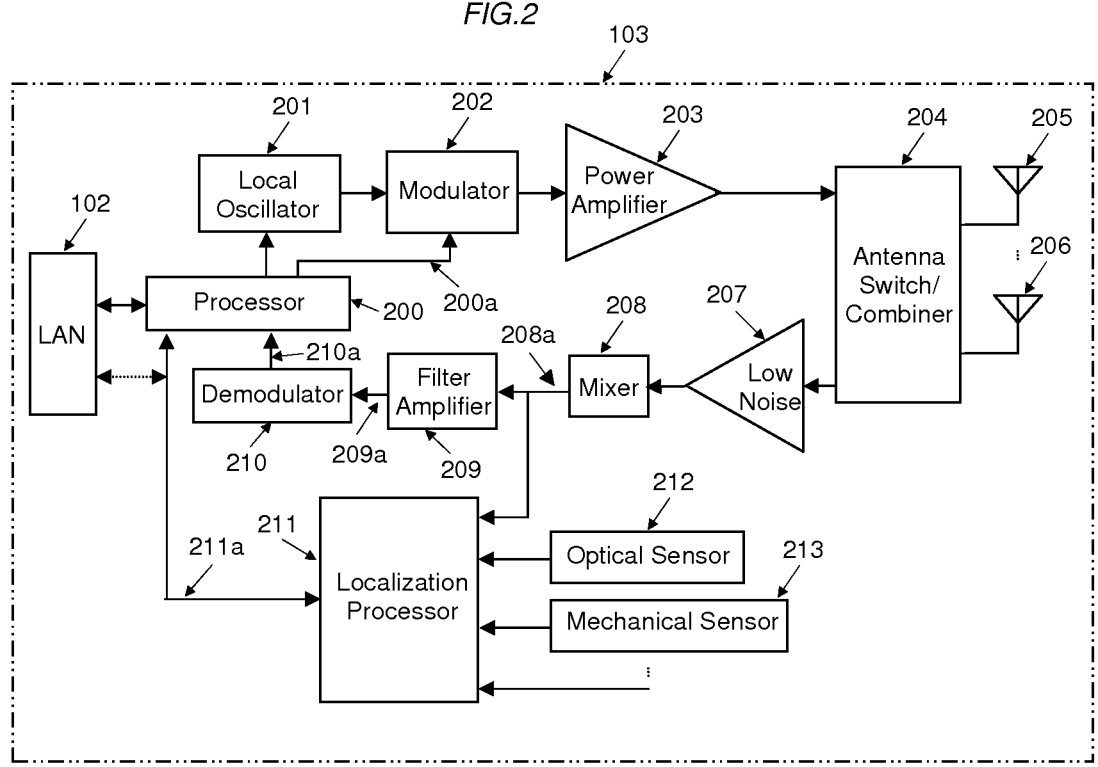

SYSTEM AND METHOD FOR WIRELESS COMMUNICATIONS

CROSS-REFERENCE TO RELATED APPLICATION

This application is a continuation application based on U.S. patent application Ser. No. 12/134,710 filed on Jun. 6, 2008, which issued as U.S. Pat. No. 8,149,093 on Apr. 3, 2012.

FIELD OF THE INVENTION

The following relates to RFID systems and, more particularly, to a method and apparatus for micro-localization of UHF passive RFID tags moving along a known, unidirectional path.

BACKGROUND OF THE INVENTION

Radio Frequency Identification (RFID) systems use RFID tags to identify and/or track objects or living things. Typically, the tags are affixed to respective objects and when these tags are excited, they produce or reflect a magnetic or electric field at some frequency. The reflected field is modulated with an identifying code to identify the particular tag, and/or other useful information.

An RFID tag may either be active or passive. Whereas active tags have a self-contained power supply and signal source, a passive tag receives an exciting signal at an exciting frequency from a transmitting antenna of an interrogator or reader positioned. Typically, the transmitting antenna is positioned at a portal. The exciting signal causes the RFID tag to transmit a signal, which is received by a receiving antenna adjacent to the transmitting antenna. The receiving antenna receives the modulated signal (magnetic or electromagnetic) produced by the excited tag and consequently the tag and the object to which it is attached can be identified.

Interest in adopting RFID technology for use in automation systems and requiring minimal manual involvement is increasing rapidly. RFID systems are capable of providing real-time object visibility enabling continuous identification and location of all items and thereby providing real-time data management instead of simple snapshots.

While the use of RFID tags is well known, most current RFID systems do not have the ability to locate fast moving tags (two meters per second i.e. 2 m/s or higher) with the accuracy required in many applications. Complexities are attributable to various factors including that the horizontal and vertical dimensions of the detection volume in which the RFID tags are to be read may contain several tags producing several signals, as well as noise, reflections and polarization losses.

Prior approaches for addressing such complexities include confining the RF waves to a small volume using RF reflecting and absorbent materials, and/or controlling the angular extent of the interrogation zone (and thus the tag transmission zone) by using a two-element antenna to transmit a data signal with a directional sum pattern and a scrambled signal with a complementary difference pattern. Other approaches include the use of techniques relating to Doppler shift and triangulation.

While various techniques for localization of RFID tags are known, improvements are of course desirable.

It is an object of an aspect of the following to provide a method and system for wireless communications that addresses at least one of the above complexities.

SUMMARY OF THE INVENTION

According to one aspect there is provided a method of estimating position of a moving RFID tag, comprising transmitting at least one interrogator signal; receiving, at an interrogator antenna, a reflected signal from the RFID tag; determining phase changes of the reflected signal with respect to the phase of the at least one interrogator signal; weighting the phase changes based on instant power corresponding to the phase changes; producing a phase trajectory for the reflected signal based on the weighted phase changes; and estimating position of the RFID tag relative to the interrogator antenna based on the peak of the phase trajectory for the reflected signal.

According to another aspect there is provided a system for estimating position of a moving RFID tag, comprising a transmitter for transmitting at least one interrogator signal; a receiver in communication with at least one interrogator antenna receiving a reflected signal from the RFID tag; a phase detector determining phase changes of the reflected signal with respect to the phase of the at least one interrogator signal; a power detector determining instant power of the reflected signal corresponding to the phase changes; a phase peak estimator weighting the phase changes based on instant power and producing a phase trajectory for the reflected signal based on the weighted phase changes; and a position estimator estimating position of the RFID tag relative to the at least one interrogator antenna based on the peak of the phase trajectory.

BRIEF DESCRIPTION OF THE DRAWINGS

Embodiments will now be described more fully with reference to the accompanying drawings, in which:

FIG. 1 shows a block diagram of an illustrative Radio Frequency Identification (RFID) system;

FIG. 2 shows a block diagram of an Interrogation unit used in the RFID system of FIG. 1, equipped with a Localization Processor;

DETAILED DESCRIPTION OF THE EMBODIMENTS

Referring to FIG. 1, shown therein is a block diagram of an RFID system using passive technology (modulated backscattering). An Application Processor 101 communicates over Local Area Network 102 to a plurality of Interrogators 103-104. The Interrogators may then each communicate with one or more of the Tags 105-107. In reference with FIG. 2, the Interrogator 103 receives commands and information from an Application Processor 101. A Processor 200 formats an Interrogator-Tag message (200a) based on the command and information received from the application Processor 101 to be sent to the Tag. The information signal (200a) may include information specific to Tag such as which Tag is to respond (each Tag may have a programmed identification number), instructions for the Tag's processor to execute or other information to be used and/or stored by the Tag's processor. With reference to FIG. 2, Local Oscillator 201 synthesizes a carrier wave (CW) signal, the Modulator 202 modulates the CW using Information Signal 200a and the Power Amplifier 203 applies the signal to an Antenna Switch/Combiner 204. The Antenna Switch/Combiner 204 applies the amplified modulated signal to one or several transmit/receive antennae 205-206.

Figure 3:
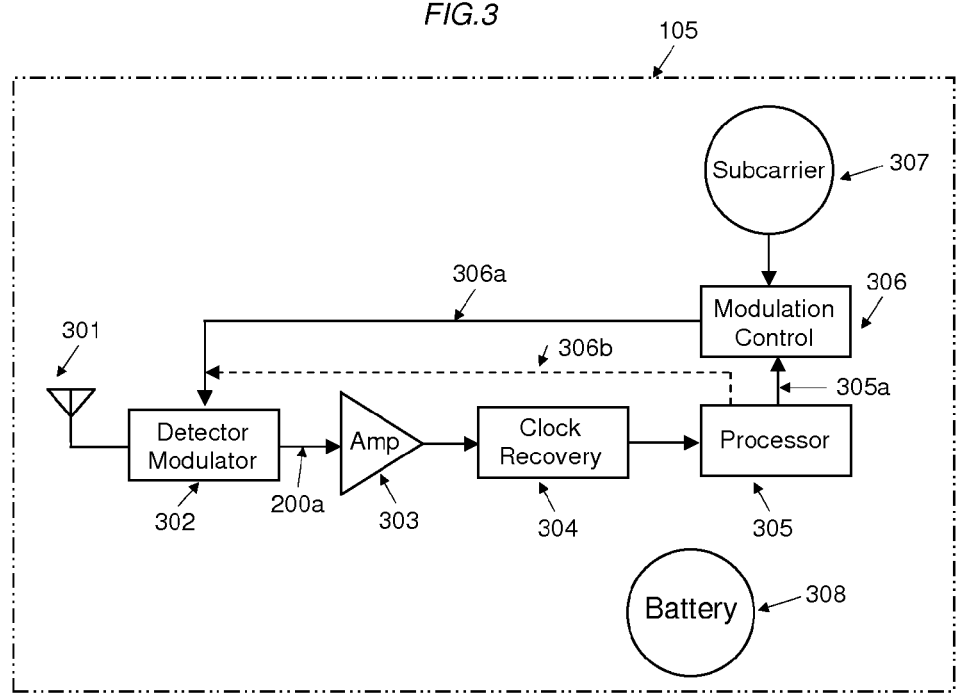
FIG. 3 shows a block diagram of an RFID tag used in the RFID system of FIG. 1.

In the Tag 105 (see FIG. 3), the antenna 301 receives the modulated signal. This signal is demodulated directly to baseband, using the Detector/Modulator 302. The Information Signal 200a is then amplified by Amplifier 303 and bit synchronization is recovered in Clock Recovery circuit 304. The resulting information detected using the recovered clock is sent to a tag Processor 305. The processor 305 generates an Information Signal 305a based on the particular program executed by processor 305. Signal 305a is eventually communicated to be sent from the Tag 105 back to the Interrogator (e.g. 103). Information Signal 305a is sent to a Modulator Control circuit 306 which uses the Information Signal 305a to modulate a subcarrier frequency generated by the Subcarrier generator 307 to produce signal 306a. The Modulated Subcarrier 306a is used by the Detector/Modulator 302 to modulate the CW received from Tag 105 to produce a backscattered (i.e. reflected) signal. A Battery 308 or other power supply provides power to the circuitry of Tag 105. Power may also be received, for example, by using inductive coupling or microwaves.

Returning to FIG. 2, the Interrogator 103 receives the modulated and reflected signal with the Antennae 205-206, amplifies the signal with a Low Noise Amplifier 207 and demodulates the signal using a Quadrature Mixer 208. Using the same Local Oscillator 201 as used in the transmit chain means the demodulation to baseband is done using Homodyne detection; this has advantages in that the received signal has the same reference as the Local Oscillator signal and it greatly reduces phase noise in the receiver. The Mixer 208 then sends the Quadrature Demodulated Signal 208a to a Filter/Amplifier 209 and a location processor 211. The filtered and amplified signal—typically an Information Signal 209a carried on a subcarrier—is them demodulated from the subcarrier in the Demodulator 210 which then sends the Information Signal 210a to a Processor 200 to determine the content of the message.

Using the above techniques, as an example an inexpensive, short-range, bi-directional digital radio communications channel can be implemented.

Figure 4:
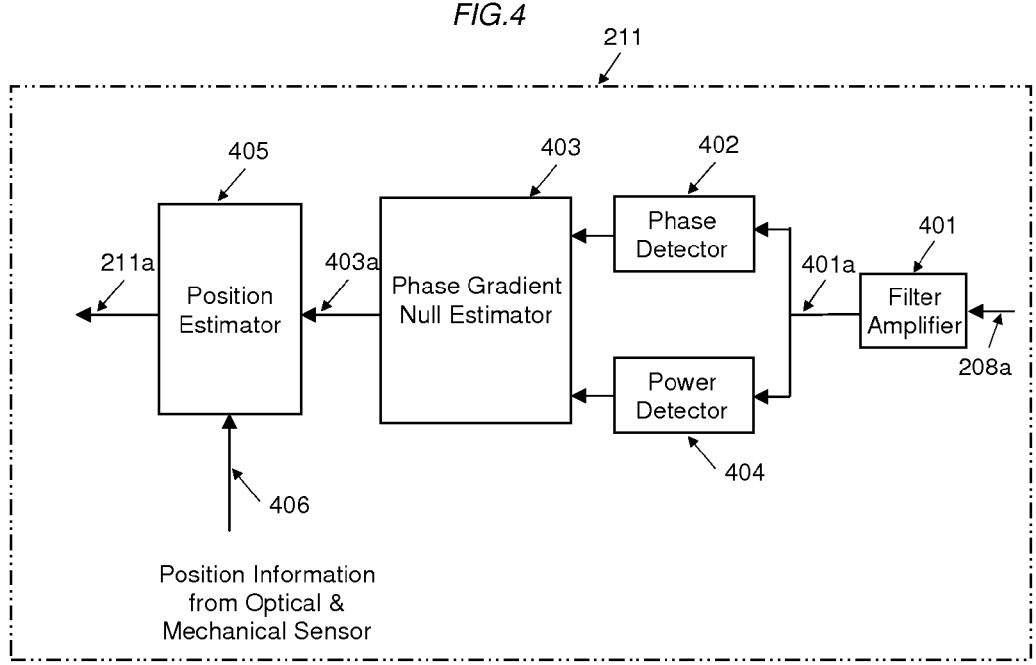
FIG. 4 shows a block diagram of the Localization Processor used in the Interrogator of FIG. 2.

We discuss now how a Modulated Backscattering system is used to determine the relative position between a Tag and an Interrogator antenna, as an example. For this example, assume that the Tag is moving in a constant direction and at a constant velocity under an Interrogator antenna during the period of time the measurement will be taken. Returning to FIG. 2, the Quadrature Signal 208a at the output of the Quadrature Mixer 208 is also applied to the Localization Processor 211. The Localization Processor also receives Position Information Signals from an Optical Sensor 212 and/or Mechanical Sensor 213, or any other position sensors. The Localization Processor 211 sends commands to the Processor 200 to specify which Tag is to respond, transmit power, antenna selection, and Information Signals such as Tag position estimate. The block diagram of the Localization Processor 211 is shown in FIG. 4. The Quadrature Signal 208a is filtered to remove data modulation and preserve only amplitude and phase changes caused by the Tag moving and then amplified by the Filter/Amplifier 401; the Filter/Amplifier 401 may or may not have the same characteristics as the Interrogator main Filter/Amplifier 209. The filtered and amplified signal 401a is applied to a Phase Detector 402. The Phase Detector 402 measures the phase difference between the transmitted signal (Local Oscillator) and the received signal. The phase difference is represented as:

$$\phi = a\tan(q/i)$$

where: q is the quadrature-phase component of the demodulated signal; and i is the in-phase component of the demodulated signal.

Figure 5:
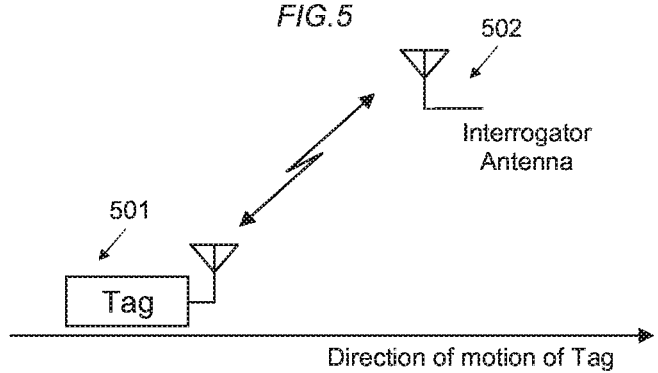
FIG. 5 shows the relative position between a moving RFID tag and the Interrogator antenna during phase and power measurements.
Figure 6:
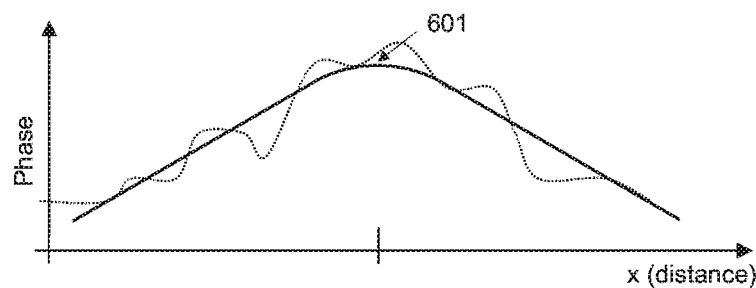
FIG. 6 is a graph showing the averaged phase trajectory of demodulated signal received by an RFID tag moving under an Interrogator antenna.

FIG. 6 is a graph of the averaged phase trajectory (solid line) of demodulated signal received by an RFID tag moving under an Interrogator antenna. Raw data phase trajectory with multi path influence is shown as broken curve. Referring to FIGS. 5 and 6, as a Tag 501 is moving along direction x approaching an Interrogator antenna 502, the received signal phase increases reaching a peak 601 at the antenna passing point, then it decreases when the tag is moving away from the antenna.

Figure 7:
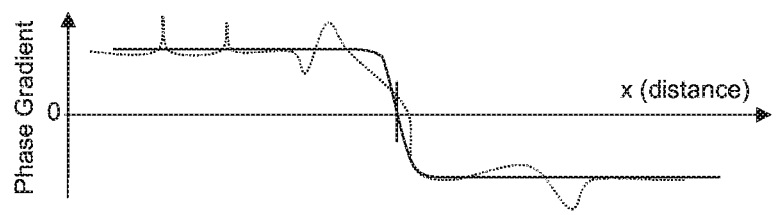
FIG. 7 is a graph showing the average trajectory of the gradient of the phase of the signal received from an RFID tag moving under an Interrogator antenna.
Figure 8:
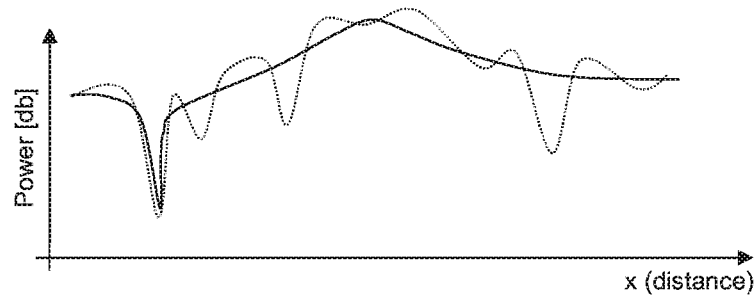
FIG. 8 is a graph showing the averaged power trajectory of the received signal from an RFID tag moving under an Interrogator antenna.

FIG. 7 shows the average trajectory of the gradient of the phase (solid line) of the signal received from a tag moving under an Interrogator antenna. Raw data phase gradient trajectory with multi path influence is shown as broken curve. FIG. 8 shows the averaged power trajectory (solid line) of the received signal from a tag moving under an Interrogator antenna. Raw data power trajectory with multi path influence is shown as broken curve.

The mean phase spatial gradient is represented as:

$$\phi' = d\phi/dx$$

where: dφ is the phase differential; and dx is the differential displacement.

As can be seen in FIG. 7, dφ crosses the zero line when the Tag passes by the antenna. By accurately detecting the zero crossing of the mean phase gradient, one can determine the moment a Tag passes a known position.

For a single signal propagation path, the mean spatial gradient of the phase of the signal equals the mean Doppler, fd. In a practical situation, reflecting structures present in the vicinity of reading point cause a rich multipath radio propagation environment. In multipath channels, the mean phase spatial gradient is commonly denoted 'random-FM'. The mean Doppler and the mean phase gradient are not always identical in multipath environments. However, this has no practical impact on the detection of the zero crossing point as only relative behavior of phase gradient before and after antenna passing point is needed for the identification of the zero crossing and consequently the antenna passing point.

The multipath effect and measurement noise makes it difficult to detect the peak of the phase trajectory directly from measurements. The multipath propagation causes random phase jumps/steps (for the phase gradient this appears as random-FM transients/'spikes'). Furthermore, different antennae connected to the same Interrogator may show a different peak position and different overlaid phase jumps.

The phase gradient zero-crossing detection is performed by a Phase Gradient Null Estimator 403 as follows. First, the phase trajectories are found from the raw data received. Obvious outliers (jumps) are then detected, and mean powers around these jumps are measured using a Power Detector 404. The measurements are weighted according to a relationship between instant power and magnitude of phase gradient transient. More particularly, instant power monitoring is used more precisely to identify outliers in phase and phase gradient. Following this, signal smoothing is performed. Finally, the measurements are averaged and a new phase peak estimate is extracted. Higher order phase derivatives can also be used to refine the passing point estimation. For example the $2^{nd}$ order derivative of the phase (the phase curvature) can be used to identify a turn tangent occurring at the passing point. Furthermore, in more sophisticated implementations, the Phase Peak Estimator 403 can be a Kalman filter followed by a linear regression of the phase gradient to find the phase gradient trajectory zero crossing that also identifies the antenna passing point.

The Phase Peak Information Signal 405a is applied to a Position Estimator 406 along with additional Position Information from Optical and Mechanical sensors 407. Other auxiliary dimension, range or position information may be used and be retrieved from typical sensor systems and sources found in RFID and parcel applications, such as X-ray imaging, weight scale; acoustic/ultra-sound ranging and imaging, visual video and imaging, other radio radar. Finally, the Tag Position Information 211a is passed to the Interrogator Processor 200, along with other Tag information such as Tag identification number.

To narrow the Tag activation zone, the Interrogator antennae can be tilted to steer a null 702 in front of the reading gate (see FIG. 5).

Multiple antenna Interrogators can be used to compensate for random phase variation accompanying the envelope abrupt change caused by multipath. Combining phase information acquired by each antenna, one can smooth the phase gradient and compensate for correlated effects such as those caused by equipment imperfections. Speed sensors can be used to take into account tag speed variations.

The method and system may be embodied in a software application including computer executable instructions executed by a processing unit such as a personal computer or other computing system environment. The software application may run as a stand-alone tool or may be incorporated into other available applications to provide enhanced functionality to those applications. The software application may comprise program modules including routines, programs, object components, data structures etc. and be embodied as computer readable program code stored on a computer readable medium. The computer readable medium is any data storage device that can store data, which can thereafter be read by a computer system. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments have been described, those of skill in the art will appreciate that variations and modifications may be made without departing from the spirit and scope of the invention defined by the appended claims.

What is claimed is:

1. A method of estimating position of a moving RFID tag, comprising:
   transmitting at least one interrogator signal;
   receiving, at an interrogator antenna, a reflected signal from the RFID tag;
   determining phase changes of the reflected signal with respect to a phase of the at least one interrogator signal;
   mathematically weighting the phase changes based on instant power corresponding to the phase changes;
   producing a phase trajectory for the reflected signal based on the weighted phase changes, wherein the phase trajectory represents the phase changes with respect to a distance from the interrogator antenna; and
   generating an estimated phase trajectory based on averaged values of the phase trajectory; and
   determining a position of the RFID tag relative to the interrogator antenna based on a peak of the estimated phase trajectory for the reflected signal.

2. The method of claim 1, wherein the RFID tag is closest to the interrogator antenna when the phase of the reflected signal corresponds to the peak of the estimated phase trajectory.

3. The method of claim 1, further comprising:
   receiving, at at least one additional interrogator antenna, the reflected signal from the RFID tag;
   wherein producing the phase trajectory is based the phase changes and corresponding instant power from the reflected signal received at the at least one additional interrogator antenna.

4. The method of claim 3, wherein the at least one additional interrogator antenna receives a plurality of reflected signals from the RFID tag.

5. The method of claim 3, wherein the at least one additional interrogator antenna receives reflected signals from a plurality of RFID tags.

6. The method of claim 1, wherein the interrogator antenna receives a plurality of reflected signals from the RFID tag.

7. The method of claim 1, wherein the interrogator antenna receives reflected signals from a plurality of RFID tags.

8. A system for estimating position of a moving RFID tag, comprising:
   a transmitter for transmitting at least one interrogator signal;
   a receiver in communication with at least one interrogator antenna receiving a reflected signal from the RFID tag;
   a phase detector determining phase changes of the reflected signal with respect to a phase of the at least one interrogator signal;
   a power detector determining instant power of the reflected signal corresponding to the phase changes;
   a phase peak estimator mathematically weighting the phase changes based on instant power and producing a phase trajectory for the reflected signal based on the weighted phase changes, wherein the phase trajectory represents the phase changes with respect to a distance from the interrogator antenna;
   the phase peak estimator further generating an estimated phase trajectory based on averaged values of the phase trajectory; and
   a position estimator determining a position of the RFID tag relative to the at least one interrogator antenna based on a peak of the estimated phase trajectory.

9. The system of claim 8, wherein the position estimator indicates that the RFID tag is closest to the interrogator antenna when the phase of the reflected signal corresponds to the peak of the estimated phase trajectory.

10. The system of claim 8, wherein:
the phase detector and the power detector determine phase change and instant power, respectively, from the reflected signal received from the RFID tag at at least one additional interrogator antenna;
wherein determining the phase trajectory by the phase peak estimator is based on the phase changes and corresponding instant power from the reflected signal received at the at least one additional interrogator antenna.

11. The method of claim 10, wherein the at least one additional interrogator antenna receives a plurality of reflected signals from the RFID tag.

12. The method of claim 10, wherein the at least one additional interrogator antenna receives reflected signals from a plurality of RFID tags.

13. The method of claim 10, wherein the interrogator antenna receives a plurality of reflected signals from the RFID tag.

14. The method of claim 10, wherein the interrogator antenna receives reflected signals from a plurality of RFID tags.

* * * * *